United States Patent
Fujioka et al.

(10) Patent No.: US 10,882,224 B2
(45) Date of Patent: Jan. 5, 2021

(54) METHOD FOR MANUFACTURING STRUCTURE MATERIAL

(71) Applicant: TORAY INDUSTRIES, INC., Tokyo (JP)

(72) Inventors: Takashi Fujioka, Ehime (JP); Yoshiki Takebe, Ehime (JP); Masato Honma, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 298 days.

(21) Appl. No.: 16/065,621

(22) PCT Filed: Dec. 9, 2016

(86) PCT No.: PCT/JP2016/086788
§ 371 (c)(1),
(2) Date: Jun. 22, 2018

(87) PCT Pub. No.: WO2017/110533
PCT Pub. Date: Jun. 29, 2017

(65) Prior Publication Data
US 2019/0299495 A1 Oct. 3, 2019

(30) Foreign Application Priority Data
Dec. 25, 2015 (JP) ................................ 2015-255264

(51) Int. Cl.
*B29C 39/38* (2006.01)
*B29C 39/18* (2006.01)
(Continued)

(52) U.S. Cl.
CPC .............. *B29C 39/38* (2013.01); *B29C 39/18* (2013.01); *B29C 43/18* (2013.01); *B29C 43/52* (2013.01);
(Continued)

(58) Field of Classification Search
CPC ................................ B29C 39/38; B29C 39/18
See application file for complete search history.

(56) References Cited

U.S. PATENT DOCUMENTS

2004/0058027 A1* 3/2004 Guichard ................ B29C 43/52
425/174.6
2010/0068518 A1* 3/2010 Honma ...................... C08J 5/24
428/401
(Continued)

FOREIGN PATENT DOCUMENTS

CN 1243135 A 2/2000
CN 1732213 A 8/2009
(Continued)

OTHER PUBLICATIONS

Extended European Search Report dated Jul. 18, 2019, for European Patent Application No. 16878425.4.
(Continued)

*Primary Examiner* — Nathan T Leong
(74) *Attorney, Agent, or Firm* — Birch, Stewart, Kolasch & Birch, LLP

(57) ABSTRACT

A method for manufacturing a structure material is a method for manufacturing a structure material that includes a thermoplastic resin, reinforced fibers, and voids. The method includes: a first process for arranging a structure precursor comprising the thermoplastic resin and the reinforced fibers in a mold with a surface temperature of 80° C. or less; a second process for raising the surface temperature of the mold up to a temperature at which a storage elastic modulus (G') of the structure precursor is less than $1.2\times10^8$ Pa; a third process for lowering the surface temperature of the mold down to a temperature at which the storage elastic modulus (G') of the structure precursor is $1.2\times10^8$ Pa or more; and a (Continued)

fourth process for removing a structure material obtained after end of the third process from the mold.

15 Claims, 6 Drawing Sheets

(51) Int. Cl.
B29C 43/18 (2006.01)
B29C 43/52 (2006.01)
B29C 70/28 (2006.01)
B32B 27/12 (2006.01)
C08J 5/04 (2006.01)
B29C 70/46 (2006.01)
B29K 101/10 (2006.01)
B29K 101/12 (2006.01)
B29K 105/06 (2006.01)
B29K 105/04 (2006.01)

(52) U.S. Cl.
CPC ............. *B29C 70/28* (2013.01); *B29C 70/46* (2013.01); *B32B 27/12* (2013.01); *C08J 5/04* (2013.01); *C08J 5/042* (2013.01); *B29K 2101/10* (2013.01); *B29K 2101/12* (2013.01); *B29K 2105/04* (2013.01); *B29K 2105/06* (2013.01); *C08J 2300/22* (2013.01); *C08J 2300/24* (2013.01)

(56) References Cited

U.S. PATENT DOCUMENTS

2010/0227152 A1* 9/2010 Nishibori .............. B29C 44/105
428/316.6
2014/0356612 A1* 12/2014 Sano .................... C08L 23/0846
428/298.7
2016/0318262 A1 11/2016 Prat et al.
2017/0157889 A1* 6/2017 Ishikawa ................ B32B 37/06

FOREIGN PATENT DOCUMENTS

| CN | 101508190 A | 8/2009 |
|---|---|---|
| EP | 1582553 A1 | 10/2005 |
| EP | 2716433 A1 | 4/2014 |
| EP | 2774939 A1 | 9/2014 |
| JP | 6-105932 A | 4/1994 |
| JP | 6-134876 A | 5/1994 |
| JP | 10-296772 A | 11/1998 |
| JP | 2006-321897 A | 11/2006 |
| JP | 2012-136592 A | 7/2012 |
| JP | 2012-192645 A | 10/2012 |
| JP | 2012-196899 A | 10/2012 |
| JP | 2014-95034 A | 5/2014 |
| JP | 2015-30755 A | 2/2015 |
| JP | 2015-85613 A | 5/2015 |
| JP | 1803551 A1 | 7/2017 |
| WO | WO 2015/083820 A1 | 6/2015 |
| WO | WO 2015/097403 A2 | 7/2015 |

OTHER PUBLICATIONS

Chinese Office Action dated Oct. 22, 2019, for Chinese Application No. 201680076133.4, with English translation.
International Search Report for PCT/JP2016/086788 (PCT/ISA/2010) dated Jan. 10, 2017.
Written Opinion of the International Searching Authority for PCT/JP2016/086788 (PCT/ISA/237) dated Jan. 10, 2017.

* cited by examiner (a)

(b)

(a)

(b)

(c)

(d)

METHOD FOR MANUFACTURING STRUCTURE MATERIAL

FIELD

The present invention relates to a method for manufacturing a structure material including a resin, reinforced fibers, and voids.

BACKGROUND

In recent years, market demands for improvement in stiffness and lightness are increasing year by year for industrial products such as automobiles, aircraft, and sporting products. To meet these demands, fiber-reinforced plastics excellent in stiffness and lightness are widely used for various kinds of industrial applications. Among them, to satisfy lightness, structure materials having voids and methods for manufacturing the same are studied. To causes voids to be contained in a structure material, a method using a foaming material and a method that achieves foaming using a large-scale apparatus are being studied, for example (refer to Patent Literature 1 to Patent Literature 3). In addition, internal pressure molding and external pressure molding are known as methods for making a structure material a hollow shape (refer to Patent Literature 4).

CITATION LIST

Patent Literature

Patent Literature 1: Japanese Patent Application Laid-open No. H10-296772
Patent Literature 2: Japanese Patent Application Laid-open No. 2012-136592
Patent Literature 3: Japanese Patent Application Laid-open No. H06-134876
Patent Literature 4: Japanese Patent Application Laid-open No. H06-105932

SUMMARY

Technical Problem

However, structure materials do not preferably contain any foaming material in view of increasing mechanical characteristics, and using a large-scale apparatus increases costs, which is thus not preferred. Meanwhile, the internal pressure molding and the external pressure molding require to take time for preforming and also require a large amount of auxiliary materials, which is thus not preferred in view of productivity.

The present invention has been made in view of the above problems, and an object thereof is to provide a method for manufacturing a structure material that can easily form a complicated shape and can manufacture a structure material excellent in lightness and mechanical characteristics. Another object of the present invention is to provide a method for manufacturing a structure material that can manufacture a structure material without requiring high costs.

Solution to Problem

A method for manufacturing a structure material according to a first embodiment of the present invention is a method for manufacturing a structure material that includes a thermoplastic resin, reinforced fibers, and voids. The method includes: a first process for arranging a structure precursor comprising the thermoplastic resin and the reinforced fibers in a mold with a surface temperature of 80° C. or less; a second process for raising the surface temperature of the mold up to a temperature at which a storage elastic modulus (G') of the structure precursor is less than $1.2 \times 10^8$ Pa; a third process for lowering the surface temperature of the mold down to a temperature at which the storage elastic modulus (G') of the structure precursor is $1.2 \times 10^8$ Pa or more; and a fourth process for removing a structure material obtained after end of the third process from the mold.

A method for manufacturing a structure material according to a second embodiment of the present invention is a method for manufacturing a structure material that includes a thermosetting resin, reinforced fibers, and voids. The method includes: a first process for arranging a structure precursor comprising the thermosetting resin before setting and the reinforced-fibers in a mold with a surface temperature of 80° C. or less; a second process for raising the surface temperature of the mold up to a temperature at which a degree of curing of the structure precursor is 10% or more and 90% or less; a third process for maintaining a shape until the degree of curing of the structure precursor becomes higher than 90%; and a fourth process for removing a structure material obtained after end of the third process from the mold.

In the structure material according to the first mode of the present invention, a filling rate of the structure precursor in the mold is within a range of 10% or more and 80% or less of a cavity of the mold.

In the method for manufacturing the structure material according to the present invention, a pressurizing force to the mold at the second process and the third process is within a range of 0 MPa or more and 5 MPa or less.

In the method for manufacturing the structure material according to the present invention, a size of a cavity of the mold does not change before and after molding.

In the method for manufacturing the structure material according to the present invention, at least one of a thermosetting resin composition containing a thermosetting resin and a thermoplastic resin composition containing a thermoplastic resin is arranged on a surface of the structure material.

In the method for manufacturing the structure material according to the present invention, a weight of the mold is 30 kg or less.

In the method for manufacturing the structure material according to the present invention, the structure precursor contains a foaming agent.

In the method for manufacturing the structure material according to the present invention, the structure precursor comprises a mat comprising reinforced fibers and a matrix resin comprising either a thermosetting resin or a thermoplastic resin, and the mat comprising reinforced fibers is impregnated with a resin in advance.

In the method for manufacturing the structure material according to the present invention, a mat comprising the reinforced fibers has a nonwoven fabric-like form manufactured by any of a wet paper making method, a dry paper making method, an air-laid method, and a weaving method.

In the method for manufacturing the structure material according to the present invention, a matrix resin in the structure precursor is given in any form of film, particles, fibers, and liquid.

In the method for manufacturing the structure material according to the present invention, the first process includes a process for arranging the structure precursor made into a rectangular or wound body in the mold.

In the method for manufacturing the structure material according to the present invention, a shape of the mold is cylindrical columnar, polygonal columnar, cylindrical tubular, or polygonal tubular.

In the method for manufacturing the structure material according to the present invention, a pressurizing force to the mold at the second process and the third process is 0 MPa.

Advantageous Effects of Invention

The present invention can provide a method for manufacturing a structure material that can manufacture a structure material excellent in lightness and mechanical characteristics without requiring high costs. In addition, the present invention can provide a method for manufacturing a structure material that can manufacture a structure material without requiring high costs.

DESCRIPTION OF EMBODIMENTS

Figure 1:
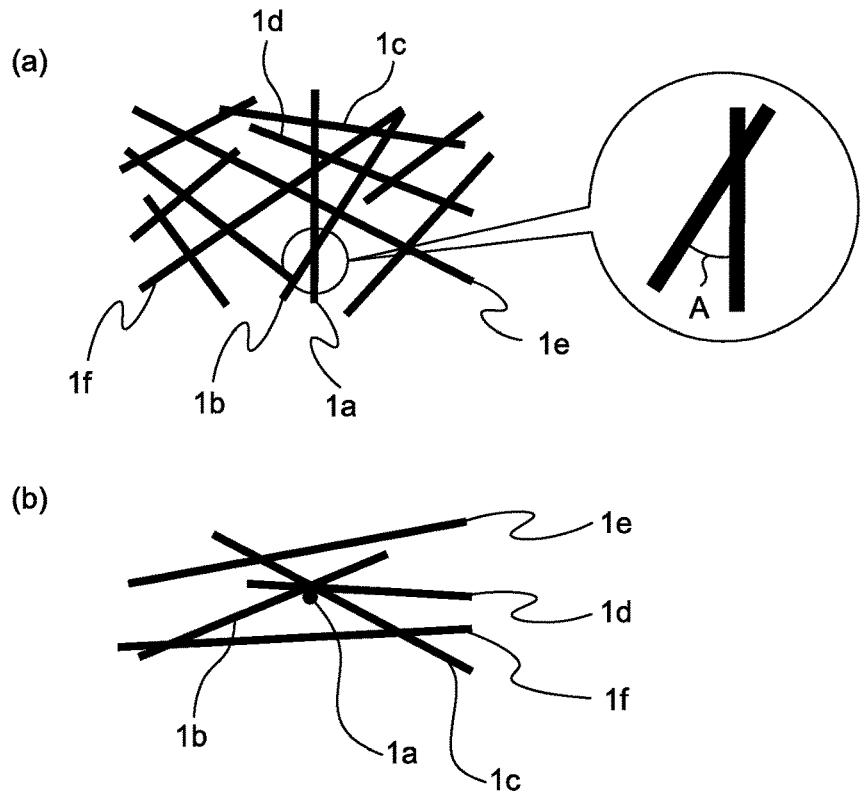
FIG. 1 is a schematic diagram of an example of a dispersion state of reinforced fibers in a fiber-reinforced mat used in the present invention.

The following describes a method for manufacturing a structure material according to the present invention.

A method for manufacturing a structure material according to a first embodiment of the present invention is a method for manufacturing a structure material including a thermoplastic resin, reinforced fibers, and voids and includes a first process for arranging a structure precursor including the thermoplastic resin and the reinforced fibers in a mold with a surface temperature of 80° C. or less, a second process for raising the surface temperature of the mold up to a temperature at which a storage elastic modulus (G') of the structure precursor is less than $1.2 \times 10^8$ Pa, a third process for lowering the surface temperature of the mold down to a temperature at which the storage elastic modulus (G') of the structure precursor is $1.2 \times 10^8$ Pa or more, and a fourth process for removing a structure material obtained after the end of the third process from the mold.

According to this method of manufacture, at the first process, an operator can perform preforming easily by hand on the mold at a low temperature, which can make a complicated shape, and thus a structure material excellent in lightness and mechanical characteristics can be manufactured. The surface temperature is more preferably 50° C. or less. When the surface temperature is 50° C. or less, during a manufacturing process, the first process can be performed only with a simple protector, and the structure precursor can be preformed to a finer shape, which is thus desirable. In other words, working efficiency dramatically increases. That is also preferred in view of reducing the possibility that the operator could have a moderate-temperature burn or the like even if the time during which the structure precursor is arranged is prolonged at the first process.

At the second process, the surface temperature of the mold is required to be increased up to the temperature at which the storage elastic modulus (G') of the structure precursor is less than $1.2 \times 10^e$ Pa. Specifically, a temperature of the glass transition temperature or the crystallization temperature of the structure precursor or more can be within the above range; the range can be achieved by giving a temperature that is higher than the melting point or the softening point of structure precursor by 10° C. or more and is the thermal decomposition temperature of the structure precursor or less. In addition, when the storage elastic modulus (G') of the structure precursor is $1.2 \times 10^8$ Pa or more at the second process, shaping (the formation of shape) into the mold may be difficult.

At the third process, the surface temperature of the mold is required to be lowered down to the temperature at which the storage elastic modulus (G') of the structure precursor is $1.2 \times 10^8$ Pa or more. In view of removing the structure material from mold at the fourth process after the third process, the storage elastic modulus of the structure precursor is preferably higher; specifically, the temperature is preferably lower than the melting point or the softening point of the structure precursor by 30° C. or more and preferably lower than it by 50° C. or more in view of reducing a molding cycle.

A method for manufacturing a structure material according to a second embodiment of the present invention is a method for manufacturing a structure material including a thermosetting resin, reinforced fibers, and voids and is a method for manufacturing a structure material including a first process for arranging the structure precursor including the thermosetting resin before setting and the reinforced-fibers in a mold with a surface temperature of 80° C. or less, a second process for raising the surface temperature of the mold up to a temperature at which a degree of curing of the structure precursor is 10% or more and 90% or less, a third process for maintaining a shape until the degree of curing of the structure precursor becomes higher than 90%, and a fourth process for removing a structure material obtained after the end of the third process from the mold.

At the second process, the degree of curing of the structure precursor is required to be within a range of 10% or more and 90% or less. The degree of curing of the structure precursor at the second process is preferably 30% or more and more preferably 60% or more in view of the surface quality of the structure material after being molded and mechanical characteristics to be obtained. When the degree of curing exceeds 90%, shape followability may be poor. A method for measuring the degree of curing of the structure precursor is measured by a method that determines it from a glass transition temperature (hereinafter, abbreviated to Tg). Specifically, a lowest Tg is measured from a saturated Tg in advance, and the difference of the lowest Tg from the saturated Tg is represented as percentage. Next, the thermosetting resin before setting is heated to obtain correlation among heating temperature, heating time, and Tg, and Tg can be interpolated from the molding conditions.

Furthermore, a method that determines a cured state from a calorific value measured by DSC on the structure precursor can be exemplified. The calorific value of the structure precursor is measured in advance, and a residual reaction rate can be determined from the rate of the calorific value of the structure precursor after being heated, for example. Tg can be measured by a known differential scanning calorimeter (DSC). The degree of curing of the structure precursor at the third process can also be measured in a similar manner.

A filling rate of the structure precursor within the mold is desirably within a range of 10% or more and 80% or less of a cavity of the mold. In particular, the filling rate is more desirably 20% or more and 70% or less and further desirably 30% or more and 60% or less. When the filling rate is less than 10%, deviation occurs when the structure precursor is arranged, and it is difficult to obtain a desired shape, which is thus undesirable. In contrast, the filling rate larger than 80% is undesirable in view of lightness, although a structure material can be manufactured.

A pressurizing force to the mold at the second process and the third process is desirably within a range of 0 MPa or more and 5 MPa or less. In particular, the pressurizing force is more desirably 3 MPa or less. When the pressurizing force is larger than 5 MPa, large-scale equipment such as a pressing machine is required, and high costs are required, which is thus undesirable. The pressurizing force to the mold at the second process and the third process is particularly desirably 0 MPa, thereby enabling efficient production at low costs. Examples of a method for making the pressurizing force 0 MPa include a method that performs molding using a seamless mold in which a cavity is formed by a cutting method from a lump of metal or the like. Examples thereof include a method that uses a mold that can be divided into two or more to perform molding using the mold fixed in advance by bolts or the like in view of facilitating the removal at the fourth process.

The size of the cavity of the mold does not desirably change before and after molding. That the size of the cavity of the mold changes before and after molding requires a mechanism that operates the mold and thus requires high costs, which is thus undesirable. For the mold in which the size of the cavity of the mold does not change before and after molding, a seamless mold in which a cavity is formed by a cutting method from a lump of metal or the like is preferably used. In view of facilitating the removal at the fourth process, a mold that can be divided into two or more can be used; a mold that can be fixed by bolts or the like may also be used.

At least either a thermosetting resin composition containing a thermosetting resin or a thermoplastic resin composition containing a thermoplastic resin is desirably arranged on a surface of the structure material. When a unidirectionally reinforced resin composition in which reinforced fibers are unidirectionally arranged is arranged on the surface, the mechanical characteristics of the structure material can be improved, for example. Meanwhile, when a resin sheet including a resin composition to which pigments or particles are added is arranged on the surface, the visual quality or texture of the structure material can be improved.

The weight of the mold is desirably 30 kg or less. When the weight of the mold is larger than 30 kg, it is difficult to carry it by hand, which is thus undesirable. The weight of the mold is more desirably 25 kg or less and further desirably 20 kg or less. Using such a light mold is preferred in that when moving from the first process to the second process and when moving from the second process to the third process, automated machinery such as a robot or work by a plurality of operators is not required, which can thus easily change places. The lower limit of the weight of the mold is not limited to a particular value; in the method for manufacturing a structure material according to the present invention, a mold is not preferred in view of productivity that changes its shape when the structure precursor is arranged at the first process, by a temperature change from the second process to the third process, or in the removal work at the fourth process and becomes unable to obtain a target shape through a few times of manufacturing.

The structure precursor desirably contains a foaming agent. The structure material can be thereby foamed more easily, which is thus desirable in view of weight reduction. In addition, high shaping property can be expressed for a finer mold shape. The foaming agent includes a physical foaming agent that achieves foaming through bursting of compressed gas or a physical change of gas or the like and a chemical foaming agent that produces gas through thermal decomposition or a chemical reaction. Among them, the chemical foaming agent that produces nitrogen gas or carbonic acid gas through thermal decomposition is referred to as a thermal decomposition type chemical foaming agent. The thermal decomposition type chemical foaming agent is a compound that is liquid or solid at normal temperature and is a compound that decomposes or gasifies when being heated. The thermal decomposition type chemical foaming agent does not desirably substantially interfere with a process for manufacturing the structure precursor used in the method for manufacturing a structure material according to the present invention; the decomposition temperature of the thermal decomposition type chemical foaming agent is preferably within a range of 180° C. to 250° C. Examples of such a thermal decomposition type foaming agent include azodicarbonamide, metal azodicarboxylates, dinitrosopentamethylenetetramine, N,N-dinitrosopentamethylenetetramine, 4,4-oxybis, bistetrazol diammonium.

The structure precursor desirably includes a mat including reinforced fibers and a matrix resin including either a thermosetting resin or a thermoplastic resin, and the mat including reinforced fibers is desirably impregnated with the resin in advance. Using such a structure precursor enables it to be easily arranged in the mold and enables easy preforming even for a complicated shape at the first process. The mat including reinforced fibers desirably has a nonwoven fabric-like form manufactured by any of a wet paper making method, a dry paper making method, an air-laid method, and a weaving method. The reinforced fibers desirably have the nonwoven fabric-like form in view of the easiness of the impregnation of the resin into the reinforced fibers. Furthermore, the reinforced fibers have the nonwoven fabric-like form, whereby in addition to the easiness of handleability of the nonwoven fabric itself, impregnation can be made easy even in the case of thermoplastic resins, which are generally high in viscosity, which is thus desirable. In addition, using such a structure precursor including the nonwoven fabric-like reinforced fibers can easily obtain a structure material light and excellent in mechanical characteristics. In the present invention, the thermosetting resin and the thermoplastic resin may be blended with each other; in that case, a component with an amount exceeding 50% by mass of the components contained in the resin is the name of the resin.

The matrix resin in the structure precursor is desirably given in any form of film, particles, fibers, and liquid. With this form, the mat including reinforced fibers can be easily impregnated with the resin.

The first process desirably includes a process for arranging the structure precursor made into a rectangular or wound body in the mold. The structure precursor is made into a rectangular body, whereby the structure precursor can be easily arranged even in a mold with a fine shape. The structure precursor is made into a wound body, whereby the isotropy of the structure material can be increased.

The shape of the mold is desirably cylindrical columnar, polygonal columnar, cylindrical tubular, or polygonal tubular. With this shape, shapes that have required to take time for preforming and also required many auxiliary materials can be easily formed.

The structure precursor of the structure material used in the manufacturing method according to the present invention includes resin and reinforced fibers. In one mode of the present invention, the resin desirably contains at least one thermoplastic resin. Examples of the thermoplastic resin include thermoplastic resins selected from crystalline plastics such as "polyesters such as polyethylene terephthalate (PET), polybutylene terephthalate (PBT), polytrimethylene terephthalate (PTT), polyethylene naphthalate (PEN), and liquid crystal polyesters; polyolefins such as polyethylene (PE), polypropylene (PP), and polybutylene; polyoxymethylene (POM), polyamide (PA), and polyarylene sulfides such as polyphenylene sulfide (PPS); polyketone (PK), polyether ketone (PEK), polyether ether ketone (PEEK), polyether ketone ketone (PEKK), polyether nitrile (PEN), and fluorine-based resins such as polytetrafluoroethylene; and liquid crystal polymers (LCP)", amorphous plastics such as "styrene-based resins, polycarbonate (PC), polymethyl methacrylate (PMMA), polyvinyl chloride (PVC), polyphenylene ether (PPE), polyimide (PI), polyamideimide (PAI), polyetherimide (PEI), polysulfone (PSU), polyether sulfone, and polyarylate (PAR)", phenol-based resins, phenoxy resins, polystyrene-based, polyolefin-based, polyurethane-based, polyester-based, polyamide-based, polybutadiene-based, polyisoprene-based, and fluorine-based resins, acrylonitrile-based and other thermoplastic elastomers, and copolymers and modifieds of these. Among them, polyolefin is desirably used in view of the lightness of an obtained structure material, polyamide is desirably used in view of the strength thereof, amorphous plastics such as polycarbonate and styrene-based resins are desirably used in view of the surface appearance thereof, polyarylene sulfides are desirably used in view of heat resistance, polyether ether ketone is desirably used in view of the continuous use temperature thereof, and fluorine-based resins are desirably used in view of the chemical resistance thereof.

In one mode of the present invention, the resin desirably contains at least one thermosetting resin. Examples of the thermosetting resin include unsaturated polyesters, vinyl esters, epoxy resins, phenol resins, urea resins, melamine resins, thermosetting polyimides, copolymers and modifieds of these, and resins obtained by blending at least two of these. In the structure material or the structure precursor according to the present invention, the resin may contain impact-resistant improvers such as elastomer and rubber components and other fillers and additives to the extent that the objects of the present invention are not impaired. Examples of fillers and additives include inorganic fillers, fire retardants, conductivity imparting agents, nucleators, ultraviolet absorbers, antioxidants, damping materials, antibacterial agents, insect repellents, deodorants, anti-coloring agents, thermal stabilizers, mold release agents, antistatic agents, plasticizers, lubricants, colorants, pigments, dyes, foaming agents, anti-foaming agents, and coupling agents.

Examples of the reinforced fibers include metallic fibers formed of aluminum, brass, stainless, and the like, polyacrylonitrile (PAN)-based, rayon-based, lignin-based, and pitch-based carbon fibers, graphite fibers, insulating fibers formed of glass and the like, organic fibers formed of aramid, phenylenebenzobisoxazole (PBO), polyphenylene sulfide, polyester, acrylic, nylon, polyethylene, and the like, and inorganic fibers formed of silicon carbide, silicon nitride, and the like. Surface treatment may be applied to these fibers. Examples of the surface treatment include coating treatment with metal as a conductor, treatment with coupling agents, treatment with sizing agents, treatment with binders, and adhesion treatment for additives. One of these fibers may be used alone, or two or more of them may be used in combination. Among them, PAN-based, pitch-based, and rayon-based carbon fibers, which are excellent in specific strength and specific stiffness, are desirably used in view of a weight reduction effect. Glass fibers are desirably used in view of increasing the economy of the obtained structure material; carbon fibers and glass fibers are desirably used in combination in view of a balance between mechanical characteristics and economy in particular. Furthermore, aramid fibers are desirably used in view of increasing the impact absorption and shaping property of the obtained structure material; carbon fibers and aramid fibers are desirably used in combination in view of a balance between mechanical characteristics and impact absorption in particular. Reinforced fibers coated with metal such as nickel, copper, or ytterbium can also be used in view of increasing the conductivity of the obtained structure material. Among them, PAN-based carbon fibers, which are excellent in strength and mechanical characteristics such as modulus, are more desirably used.

The reinforced fibers are desirably discontinuous and dispersed in a nearly monofilament form and in a random manner. The reinforced fibers are prepared in such a manner, whereby when a sheet-shaped structure precursor or structure material is molded by applying external force, shaping into a complex shape is made easy. In addition, the reinforced fibers are prepared in such a manner, whereby voids formed by the reinforced fibers become fine, and weak parts at fiber bundle ends of the reinforced fibers in the structure material can be minimized, and thus giving isotropy in addition to excellent reinforcing efficiency and reliability. The nearly monofilament indicates that a reinforced fiber single yarn is present as less than 500 fine-denier strands. The reinforced fibers are more desirably dispersed in a monofilament form.

Being dispersed in a nearly monofilament form or monofilament form indicates that, for a reinforced fiber freely selected in the structure material, the rate of single filaments having a two-dimensional contact angle of 1° or more (hereinafter, also referred to as a fibers dispersed rate) is 80% or more or, in other words, that a bundle in which two or more single filaments in the structure material are in contact with each other to be parallel to each other is less than 20%. Consequently, the mass fraction of a fiber bundle with a filament number of 100 or less at least in the reinforced fibers particularly preferably corresponds to 100%.

The two-dimensional contact angle refers to an angle formed by a single filament and a single filament being in contact with this single filament in the case of discontinuous reinforced fibers and is defined as an angle on an acute angle side within a range of 00 or more and 90° or less out of angles formed by the single filaments being in contact with each other. The following further describes this two-dimensional contact angle with reference to a drawing. FIG. 1 is a schematic diagram of an example of a dispersion state of the reinforced fibers in a fiber-reinforced mat when observed in a planar direction (FIG. 1(a)) and a thickness direction (FIG. 1(b)). With reference to a single filament 1a, the single filament 1a is observed to cross single filaments 1b to 1f in FIG. 1(a), whereas the single filament 1a is not in contact with the single filaments 1e and 1f in FIG. 1(b). In this case, the single filaments 1b to 1d are objects for which the two-dimensional contact angle is evaluated for the single filament 1a as the reference; the two-dimensional contact angle is an angle A on the acute angle side within a range of 0° or more and 90° or less out of the two angles formed by the two single filaments being in contact with each other.

A method for measuring the two-dimensional contact angle is not limited to a particular method; a method can be exemplified that observes the orientation of the reinforced fibers from a surface of the structure material, for example. In this case, the surface of the structure material is polished to expose the reinforced fibers, whereby the reinforced fibers become easier to be observed. Another example that can be exemplified is a method that performs X-ray computed tomography (CT) transmission observation to take an orientation image of the reinforced fibers. For the reinforced fibers having high X-ray transmissivity, fibers for a tracer are mixed into the reinforced fibers, or a chemical for a tracer is applied to the reinforced fibers, whereby the reinforced fibers become easier to be observed, which is thus desirable. When measurement is difficult by the methods, a method can be exemplified that puts the structure material into a high-temperature environment such as an oven to burn off a resin component and then observes the orientation of the reinforced fibers from the reinforced fibers that have been taken out using an optical microscope or an electron microscope.

The fibers dispersed rate is measured by the following procedure based on the method of observation described above. Specifically, the two-dimensional contact angle is measured for all the single filaments (the single filaments 1b to 1d in FIG. 1) being in contact with a single filament selected at random (the signal filament 1a in FIG. 1). This measurement is performed for 100 single filaments, and a rate is calculated from the ratio of the number of signal filaments having a two-dimensional contact angle of 1° or more to the total number of all the single filaments for which the two-dimensional contact angle is measured.

Furthermore, the reinforced fibers are particularly desirably dispersed in a random manner. The reinforced fibers being dispersed in a random manner refers to the fact that the arithmetic mean of a two-dimensional oriented angle of a reinforced fiber freely selected in the structure material is within a range of 30° or more and 60° or less. The two-dimensional oriented angle refers to an angle formed by a single filament of the reinforced fiber and a single filament crossing this single filament and is defined as an angle on an acute angle side within a range of 0° or more and 90° or less out of angles formed by the single filaments crossing each other.

The following further describes this two-dimensional oriented angle with reference to a drawing. In FIGS. 1(a) and (b), with reference to the single filament 1a, the single filament 1a crosses the other single filaments 1b to 1f. The crossing means a state in which a single filament as a reference is observed to cross other single filaments on a two-dimensional plane observed, does not necessarily require the single filament 1a and the single filaments 1b to 1f to be in contact with each other, and does not exclude a state in which the single filament 1a is observed to cross the single filaments 1b to 1f when viewed in a projected manner. In other words, focusing on the single filament 1a as the reference, all the single filaments 1b to 1f are objects for which the two-dimensional oriented angle is evaluated; in FIG. 1(a), the two-dimensional oriented angle is the angle A on the acute angle side within a range of 0° or more and 90° or less out of the two angles formed by the two crossing single filaments.

A method for measuring the two-dimensional oriented angle is not limited to a particular method; a method can be exemplified that observes the orientation of the reinforced fibers from a surface of the structure element, for example, for which means similar to the method for measuring the two-dimensional contact angle described above can be employed. The mean of the two-dimensional oriented angle is measured by the following procedure. Specifically, the mean of the two-dimensional oriented angle is measured for all the single filaments (the single filaments 1b to 1f in FIG. 1) crossing a single filament selected at random (the signal filament 1a in FIG. 1). When there are a large number of other single filaments crossing a single filament, for example, an arithmetic mean measured by selecting 20 other crossing single filaments at random may be substituted. This measurement is repeated a total of five times with reference to other single filaments, and its arithmetic mean is calculated as the arithmetic mean of the two-dimensional oriented angle.

The reinforced fibers are dispersed in a nearly monofilament form and in a random manner, whereby the performance given by the reinforced fibers dispersed in a nearly monofilament form described above can be increased to the maximum. In addition, isotropy can be imparted to the mechanical characteristics of the structure material. In view of the foregoing, the fibers dispersed rate of the reinforced fibers is desirably 90% or more and more desirably closer to 100%. The arithmetic mean of the two-dimensional oriented angle of the reinforced fibers is desirably within a range of 40° or more and 50° or less and more desirably closer to 450, which is an ideal angle.

Examples of the reinforced fibers not having a nonwoven fabric form include a sheet substrate, a woven fabric substrate, and a non-crimped substrate in which the reinforced fibers are arranged in one direction. These forms arrange the reinforced fibers regularly and densely, and thus there are few voids in the structure material, which makes the impregnation of the resin extremely difficult and may form a non-impregnated part or significantly restrict alternatives about impregnating means and/or resin type.

The form of the reinforced fibers may be any of a continuous reinforced fiber having a length similar to that of the structure material and a discontinuous reinforced fiber with a finite length cut into a certain length; it is desirably a discontinuous reinforced fiber in view of easily impregnating the reinforced fibers with the resin or being able to easily adjust the amount of the resin.

The longer of the mass mean fiber length of the reinforced fibers is desirably within a range of 1 mm or more and 15 mm or less. With this length, the reinforcing efficiency of the reinforced fibers can be increased, and thus excellent mechanical characteristics can be imparted to the structure material. When the longer of the mass mean fiber length of the reinforced fibers is less than 1 mm, the voids within the structure material are unable to be formed efficiently, and the specific gravity may increase; in other words, it is difficult to obtain the structure material with a desired thickness even with the same mass, which is thus undesirable. In contrast, when the longer of the mass mean fiber length of the reinforced fibers is longer than 15 mm, the reinforced fibers are likely to bend by their self-weight within the structure material to cause the expression of mechanical characteristics to be hindered, which is thus undesirable. The resin component of the structure material is removed by a method such as burning or eluting, 400 remaining reinforced fibers are selected at random, and the lengths thereof are measured down to 10 μm; the longer of the mass mean fiber length can be calculated as the mean length thereof. The volume content of the reinforced fibers in the structure precursor is desirably within a range of 5% by volume or more and 90% by volume or less and is more desirably within a range of 10% by volume or more and 80% by volume or less. The manufacturing method according to the present invention can obtain the structure material having high mechanical characteristics and having excellent lightness by using the structure precursor including such a composition.

The voids in the present invention each indicate a space formed by the reinforced fibers coated with the resin serving as columnar supports and overlapping with each other or crossing each other. When a structure precursor in which the reinforced fibers are impregnated with the resin in advance is heated to obtain a structure material, for example, the melting or softening of the resin along with heating raises the reinforced fibers to form the voids. This phenomenon is based on the property of the reinforced fibers inside the structure precursor in a compressed state by pressurization rising by hair raising force caused by their modulus. The content of the voids in the structure material is within a range of 10% by volume or more and 99% by volume or less. When the content of the voids is less than 10% by volume, the specific gravity of the structure material is high, and lightness is not satisfied, which is thus undesirable. In contrast, when the content of the voids is larger than 99% by volume or, in other words, the thickness of the resin coated around the reinforced fibers is small, and the reinforcing of the reinforced fibers in the structure material is not performed sufficiently to decrease mechanical characteristics, which is thus undesirable. The upper limit of the content of the voids is desirably 97% by volume. In the present invention, as to the volume content, the sum of the respective volume contents of the resin, the reinforced fibers, and the voids included in the structure material is defined as 100% by volume.

The specific bending modulus of the structure material represented as $Ec^{1/3} \cdot \rho^{-1}$ is within a range of 3 or more and 20 or less where the bending modulus of the structure material that is obtained by the manufacturing method according to the present invention is Ec and the specific gravity of the structure material is ρ. When the specific bending modulus of the structure material is less than 3, even if the bending modulus is high, the specific gravity is also high, and a desired weight reduction effect is unable to be obtained, which is thus undesirable. In contrast, when the specific bending modulus of the structure material is larger than 20, it is indicated that the bending modulus is low, although the weight reduction effect is sufficient; it is difficult to maintain a shape desired as the structure material, and the bending modulus of the structure material itself is poor, which is thus undesirable. The specific bending modulus of steel materials and aluminum is 1.5 or less in general; the region of the specific bending modulus extremely excellent compared with these metallic materials is achieved. Furthermore, the specific bending modulus of the structure material is 3 or more exceeding 2.3, which is a general specific bending modulus of carbon fiber-reinforced plastic composite materials attracting attention for their weight reduction effect, and further desirably 5 or more.

The bending modulus Ec of the structure material may be 3 GPa or more and desirably 6 GPa or more. When the bending modulus Ec of the structure material is less than 3 GPa, the range of use as the structure material is limited, which is thus undesirable. In addition, to facilitate the design of the structure material, the bending modulus desirably has isotropy. The upper limit of the bending modulus is not limited; in a structure material formed of reinforced fibers and a resin in general, a value calculated from the respective moduli of the reinforced fibers and the resin as its components can be the upper limit. In the structure material according to the present invention, both when the structure material is used alone and when it is used in combination with another member, a member is designed using the bending modulus of the structure material itself; 50 GPa is enough for practical use.

The specific gravity p of the structure material is desirably 0.9 g/cm$^3$ or less. When the specific gravity p of the structure material is larger than 0.9 g/cm$^3$, that means that mass as the structure material increases, resulting in an increase in mass when being made into a product, which is thus undesirable. The lower limit of the specific gravity is not limited; in a structure material formed of reinforced fibers and a resin in general, a value calculated from the respective volume ratios of the reinforced fibers, the resin, and the voids as its components can be the lower limit. In the structure material according to the present invention, both when the structure material is used alone and when it is used in combination with another member, the specific gravity of the structure material itself is desirably 0.03 g/cm$^3$ or more in view of maintaining the mechanical characteristics of the structure material, although it varies depending on the reinforced fibers and the resin used.

The porosity of parts within 30% to a midpoint position in the thickness direction from surfaces of the structure material is desirably within a range of 0% by volume or more and less than 10% by volume, and the porosity of a residual part is desirably within a range of 10% by volume or more and 99% by volume or less. A smaller porosity gives excellence in mechanical characteristics, whereas a larger porosity gives excellence in lightness. In other words, when the structure material is formed of a material of the same composition, the porosity of the parts within 30% to the midpoint position in the thickness direction from the surfaces of the structure material is 0% by volume or more and less than 10% by volume, thereby ensuring the mechanical characteristics of the structure material, and the porosity of the residual part is within a range of 10% by volume or more and 99% by volume or less, thereby satisfying lightness, which is thus desirable.

The thickness of the structure material in the present invention can be determined by the shortest distance connecting one point on a surface and a surface on the back thereof for which the thickness is desired to be determined. The midpoint in the thickness direction means an intermediate point in the thickness of the structure material. The parts within 30% to the midpoint position in the thickness direction from the surfaces of the structure material means parts containing up to 30% distance from the surfaces of the structure material when the distance from the surfaces of the structure material to its midpoint in the thickness direction is 100%. The residual part means a residual part after removing a part within 30% to the midpoint position in the thickness direction from one surface of the structure material and a part within 30% to the midpoint position in the thickness direction from the other surface. Parts within 30% to the midpoint position in the thickness direction from the surfaces of the structure material and a residual part may be present at different positions in the thickness direction of the structure material or present at different positions in the planar direction thereof.

The reinforced fibers in the present invention desirably have a nonwoven fabric-like form in view of the easiness of the impregnation of the resin into the reinforced fibers. Furthermore, the reinforced fibers have a nonwoven fabric-like form, whereby in addition to easy handleability of the nonwoven fabric itself, impregnation can be made easy even in the case of thermoplastic resins, which are generally high in viscosity, which is thus desirable. The nonwoven fabric-like shape indicates a form in which strands and/or monofilaments of the reinforced fibers are dispersed irregularly in a planar form; examples thereof include a chopped strand mat, a continuous strand mat, a paper-making mat, a carding mat, and an air-laid mat (hereinafter, referred to collectively as a fiber-reinforced mat).

Examples of a method for manufacturing the fiber-reinforced mat included in the structure material include a method for manufacturing the fiber-reinforced mat by dispersing the reinforced fibers in a strand and/or a nearly monofilament form in advance. Examples of the method for manufacturing the fiber-reinforced mat include a dry process such as an air-laid method that disperses the reinforced fibers to form a sheet with an airflow and a carding method that shapes the reinforced fibers while mechanically carding them to form a sheet and a wet process by Radright method that stirs the reinforced fibers in the water to make paper as known techniques. Examples of means for making the reinforced fibers closer to a monofilament form include in the dry process a method that provides fiber-opening bars, a method that vibrates fiber-opening bars, a method that makes meshes of a card finer, and a method that adjusts the rotational speed of a card. Examples thereof include in the wet process a method that adjusts the stirring condition of the reinforced fibers, a method that dilutes a reinforced fiber concentration of a dispersion, a method that adjusts the viscosity of a dispersion, and a method that inhibits an eddy when a dispersion is transferred. In particular, the fiber-reinforced mat is desirably manufactured by the wet method, and the concentration of charged fibers is increased or the flow rate (flow) of a dispersion and the speed of a mesh conveyor are adjusted, whereby the rate of the reinforced fibers in the fiber-reinforced mat can be easily adjusted. The speed of the mesh conveyor is decreased relative to the flow rate of the dispersion, whereby the orientation of fibers in an obtained fiber-reinforced mat is difficult to be directed to a taking direction, and a bulky fiber-reinforced mat can be manufactured, for example. The fiber-reinforced mat may be formed of the reinforced fibers alone. The reinforced fibers may be mixed with a matrix resin component in a powdery form or a fibrous form. The reinforced fibers may be mixed with organic compounds or inorganic compounds. The reinforced fibers may be bonded to each other with a resin component.

Furthermore, the fiber-reinforced mat is desirably impregnated with the resin in advance to form a structure precursor. In the case of particles and fibers, for example, the resin is mixed simultaneously with the reinforced fibers when the mat including reinforced fibers is manufactured to enable a nonwoven fabric-like form to be formed. In the case of liquid, the mat including reinforced fibers is immersed in the liquid, or the liquid is poured, whereby the reinforced fibers can be impregnated with the resin. In the case of film, the mat including reinforced fibers is laminated on the film or is arranged so as to hold it from both sides, whereby handleability can be improved. For a method for manufacturing the structure precursor according to the present invention, a method that applies pressure to the fiber-reinforced mat with the resin being in a state heated at a temperature melting or softening or more to impregnate the fiber-reinforced mat therewith is desirably used in view of the easiness of manufacture. Specifically, a method that melt-impregnates the fiber-reinforced mat with a laminate arranging the resin from both sides in the thickness direction can be desirably exemplified.

For equipment for implementing the methods, a compression molding machine or a double belt press can be suitably used. The former is for a batch type; an intermittent type press system arranging two or more machines for heating and cooling in a row can improve productivity. The latter is for a continuous type, which can easily perform continuous processing and is thus excellent in continuous productivity.

Examples of the fiber-reinforced mat not having a nonwoven fabric form include a sheet substrate, a woven fabric substrate, and a non-crimped substrate in which the reinforced fibers are arranged in one direction. These forms arrange the reinforced fibers regularly and densely, and thus there are few voids in the fiber-reinforced mat, and the thermoplastic resin does not form a sufficient anchoring structure, and thus when it is made into a core forming layer, bonding ability decreases. In addition, when the resin is a thermoplastic resin, impregnation is extremely difficult, which forms a non-impregnated part or significantly restricts alternatives about impregnating means or resin type.

As to the thermosetting resin composition containing a thermosetting resin and the thermoplastic resin composition containing a thermoplastic resin arranged on the surface of the structure material obtained by the method of manufacture of the present invention, examples of their functions to be given to the structure material include visual quality such as coloration, a pearl feeling, and a metallic feeling, electromagnetic wave shielding, conductivity, fire retardance, weatherability, and high stiffness. When high stiffness is an objective, for example, an intermediate sheet material in which reinforced fibers in a continuous form are impregnated with the resin can be arranged on the surface. The reinforced fibers in a continuous form are continuous with a length of 100 mm or more at least in one direction; many are arranged in one direction to form an aggregate, or what is called a reinforced fiber bundle, which is continuous across the entire length of the structure material. Examples of the form of the intermediate sheet material formed of the reinforced fibers in a continuous form include a woven fabric including reinforced fiber bundles formed of many reinforced fibers in a continuous form, a reinforced fiber bundle in which many reinforced fibers in a continuous form are arranged in one direction (a unidirectional fiber bundle), and a unidirectional woven fabric including this unidirectional fiber bundle. The reinforced fibers may include a plurality of fiber bundles of the same form or include a plurality of fiber bundles of different forms. The number of the reinforced fibers included in one reinforced fiber bundle is normally 300 to 48,000; in view of the manufacture of prepregs and the manufacture of woven fabrics, the number is desirably 300 to 24,000 and more desirably 1,000 to 12,000.

When visual quality is given, examples include pigments, glass beads, or the like as solid additives kneaded into the resin. Examples of the solid additives include organic pigments such as azo pigments and phthalocyanine blue, metallic pigments containing metallic powder of aluminum, brass, and the like, and inorganic pigments such as chromium oxide and cobalt blue. Among them, metallic pigments and inorganic pigments are preferred in view of heat resistance. When the reinforced fibers are deep in color such as carbon fibers and aramid fibers, pigments having two or more layer structures different in refractive index are preferably used; examples thereof include natural mica, artificial mica, alumina flakes, silica flakes, and glass flakes coated with titanium oxide or iron oxide. Such a layered structure can develop colors by optical phenomena such as the interference, diffraction, and scattering of light in the visible light region. When the optical phenomena such as the interference, diffraction, and scattering of light are used, colors can be developed by the reflection of light of specific wavelengths, and they are thus preferably used when the reinforced fibers with deep colors are used. Examples of the solid additives giving electromagnetic wave shielding and conductivity include metallic powders of silver, copper, nickel, and the like, ferrite, and carbon black. Examples of the solid additives giving fire retardance include phosphorous compounds, antimony compounds, metal hydroxides, zinc compounds, and melamine cyanurate. Examples of the solid additives giving weatherability include ultraviolet absorbers and hindered amine-based photostabilizers.

<Structure Material>

The volume content of the resin in the structure material that is obtained by the manufacturing method according to the present invention is within a range of 2.5% by volume or more and 85% by volume or less. When the volume content of the resin is less than 2.5% by volume, it is unable to bind the reinforced fibers within the structure material together to make the reinforcing effect of the reinforced fibers sufficient and to satisfy the mechanical characteristics especially bending properties of the structure material, which is thus undesirable. In contrast, when the volume content of the resin is larger than 85% by volume, the resin amount is too large, and it is difficult to have a void structure, which is thus undesirable.

In the structure material that is obtained by the manufacturing method according to the present invention, the volume content of the reinforced fibers is desirably within a range of 0.5% by volume or more and 55% by volume or less. When the volume content of the reinforced fibers is less than 0.5% by volume, the reinforcing effect caused by the reinforced fibers is unable to be sufficient, which is thus undesirable. In contrast, when the volume content of the reinforced fibers is larger than 55% by volume, the volume content of the resin relative to the reinforced fibers is relatively low, and it is unable to bind the reinforced fibers within the structure material together to make the reinforcing effect of the reinforced fibers sufficient and to satisfy the mechanical characteristics especially bending properties of the structure material, which is thus undesirable.

The reinforced fibers are coated with the resin, in which the thickness of the resin is preferably within a range of 1 μm or more and 15 μm or less. As to the coated state of the reinforced fibers coated with the resin, coating at least intersection points of the single filaments of the reinforced fibers contained in the structure material is sufficient in view of the shape stability of the structure material and the easiness and the degree of freedom in thickness control; as a more desirable manner, the resin is desirably coated around the reinforced fibers with the above thickness. This state means that the surface of the reinforced fibers is not exposed owing to the resin or, in other words, that the reinforced fibers form an electric wire-shaped coating by the resin. This formation further causes the structure material to have shape stability and makes its expression of mechanical characteristics sufficient. In addition, the coated state of the reinforced fibers coated with the resin is not required to be coated across the whole of the reinforced fibers and may be within a range in which the shape stability, the bending modulus, and the bending strength of the structure material according to the present invention are not impaired.

Examples of the structure material that is obtained by the manufacturing method according to the present invention include electric and electronic device parts such as "housings, trays, chassis, interior members, and cases of personal computers, displays, office automation (OA) devices, cellular phones, mobile information terminals, personal digital assistants (PDAs) (mobile information terminals such as electronic notepads), video cameras, optical devices, audio devices, air conditioners, lighting devices, entertainment goods, toy goods, and other home appliances"; "various kinds of members, various kinds of frames, various kinds of hinges, various kinds of arms, various kinds of wheel axles, various kinds of bearings for wheels, and various kinds of beams"; "outer plates and body parts such as hoods, roofs, doors, fenders, trunk lids, side panels, rear end panels, front bodies, under bodies, various kinds of pillars, various kinds of members, various kinds of frames, various kinds of beams, various kinds of supports, various kinds of rails, and various kinds of hinges"; "exterior parts such as bumpers, bumper beams, moldings, under covers, engine covers, current plates, spoilers, cowl louvers, and aerodynamic parts"; "interior parts such as instrument panels, seat frames, door trims, pillar trims, steering wheels, and various kinds of modules"; structure parts for automobiles and two-wheeled vehicles such as "motor parts, compressed natural gas (CNG) tanks, and gasoline tanks"; parts for automobiles and two-wheeled vehicles such as "battery trays, headlamp supports, pedal housings, protectors, lamp reflectors, lamp housings, noise shields, and spare tire covers"; building materials such as "wall members such as sound insulation walls and soundproofing walls"; and parts for aircraft such as "landing gear pods, winglets, spoilers, edges, rudders, elevators, fairings, ribs, and seats". In view of mechanical characteristics, the structure material is desirably used for automobile interior and exterior, electric and electronic device housings, bicycles, structure materials for sporting goods, aircraft interior materials, boxes for transportation, and building materials. Among them, the structure material is suitable for module members including a plurality of parts in particular. A cylindrical columnar, polygonal columnar, cylindrical tubular, or polygonal tubular structure material obtained by the method of manufacture of the present invention can be used for pillars of automobiles, frames of bicycles, racket frames and shafts for various kinds of sports competitions, columns and beams of buildings, for example.

Examples

The following describes the present invention specifically with reference to examples. However, the present invention is not limited to the following examples.

<Methods of Evaluation and Measurement>

(1) Specific Gravity ρ of Structure Material

A test piece was cut out of a structure material, and an apparent specific gravity of the structure material was measured with reference to JIS K7222 (2005). The test piece was cut out to be 100 mm long and 100 mm wide. The length, width, and thickness of the test piece were measured with a micrometer, and a volume V of the test pieces was calculated from the obtained values. A mass M of the cut-out test piece was measured with an electronic balance. An apparent specific gravity p was calculated by the obtained mass M and volume V and the following expression.

$$\rho \ [g/cm^3] = 10^3 \times M \ [g]/V \ [mm^3]$$

(2) Bending Test

A flat plate with a composition similar to that of each of the structure materials obtained in the examples and comparative examples was prepared so as to have a thickness described in ISO 178 Method (1993) as a test piece. Test pieces were cut out of the prepared flat plate, and the bending modulus thereof was measured in accordance with ISO 178 Method (1993). As to the test pieces, test pieces cut out in four directions including a 0° direction freely set and +45°, −45°, and 90° directions were prepared. The number of measurement n=5 was set for each of the directions, and its arithmetic mean was defined as a bending modulus Ec. As to a measurement apparatus, "INSTRON (registered trademark)" model 5565 universal material testing system (manufactured by INSTRON JAPAN Co., Ltd.) was used. From the obtained result, the specific bending modulus of a molded article was calculated by the following expression.

$$\text{Specific bending modulus} = Ec^{1/3}/\rho$$

(3) Storage Elastic Modulus (G') of Structure Precursor

For a measurement sample (0.5 mm thick and 10 mm wide) of a structure precursor, by dynamic viscoelasticity analysis (DMA), temperature was raised under conditions with a temperature raising rate of 5° C./minute, a twisting vibration frequency of 0.5 Hz, and a strain amount of 0.1%, and evaluation was performed by DMA. In this evaluation condition, a storage elastic modulus (G') at an ultimate temperature of the structure precursor in each molding condition was determined. ARES manufactured by TA Instruments product. was used as a measuring apparatus.

(4) Glass Transition Temperature (Tg) of Structure Precursor

Based on the method described in JIS K7121 (1987), using Pyris 1 DSC (a differential scanning calorimeter manufactured by PerkinElmer, Inc.), measurement was performed with a temperature raising rate of 10° C./minute. An intermediate point of a part in which an obtained DSC curve showed a stepwise change was determined to be a glass transition temperature. In this measurement, an indicator of the degree of curing was obtained from an initial glass transition temperature (Tg) of the obtained resin composition and a saturated glass transition temperature (Tg). Next, a structure precursor was molded in advance under conditions of heating temperature and heating time performed in the examples, and a glass transition temperature was measured for an obtained molded article. From the range of the obtained glass transition temperature and the glass transition temperature as the indicator, the degree of curing of the structure precursor was determined.

<Materials Used>

The following shows materials used for evaluation.

[Material 1]

A copolymer with polyacrylonitrile as a main component was subjected to spun processing, calcined processing, and surface oxidation treatment processing to obtain a continuous carbon fiber with a total single yarn number of 12,000. The characteristics of this continuous carbon fiber 1 were as follows.

Figure 2:
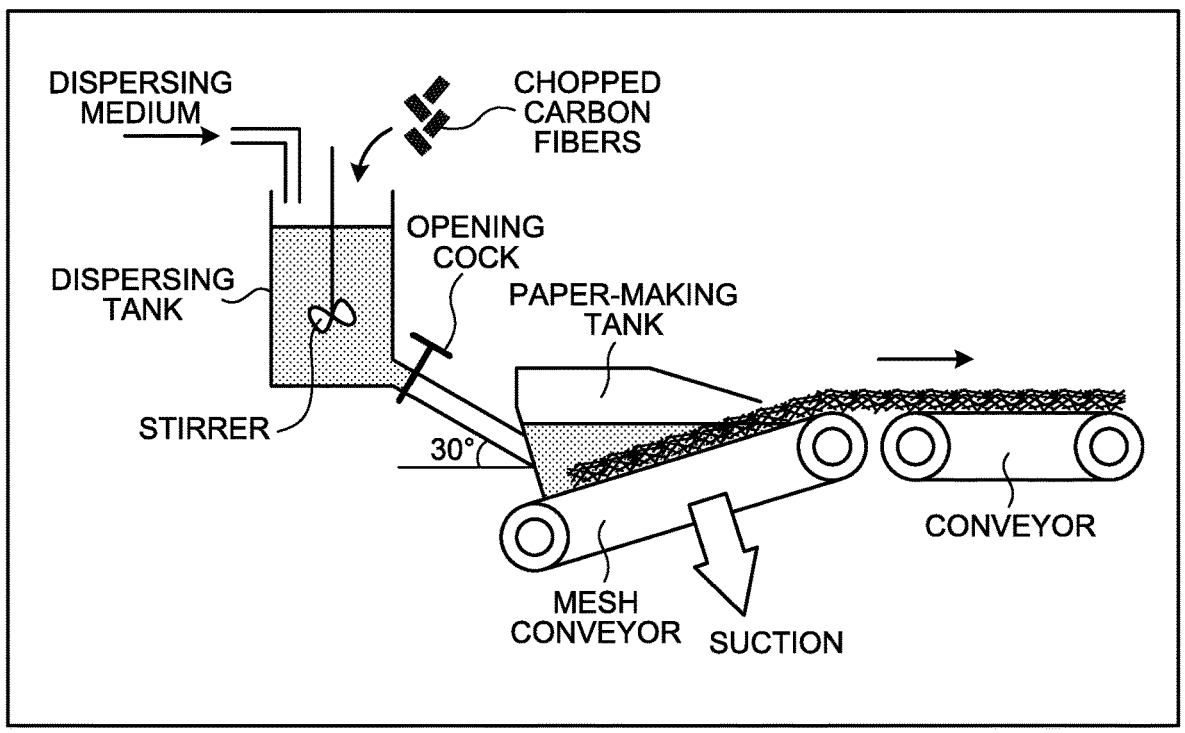
FIG. 2 is a schematic diagram of an example of an apparatus for manufacturing a fiber-reinforced mat.

Single filament diameter: 7 μm
Mass per unit length: 1.6 g/m
Specific gravity: 1.8
Tensile strength: 4,600 MPa
Tensile modulus: 220 GPa The obtained carbon fiber 1 was cut into 6 mm with a strand cutter to obtain chopped carbon fibers. A dispersion with a concentration of 0.1% by mass containing water and a surfactant (polyoxyethylene lauryl ether (product name) manufactured by nacalai tesque) was prepared. Using this dispersion and the chopped carbon fibers, a fiber-reinforced mat was manufactured using an apparatus for manufacturing a fiber-reinforced mat illustrated in FIG. 2. The manufacturing apparatus includes a cylindrical vessel with a diameter of 1,000 mm having an opening cock at the lower part of the vessel as a dispersing tank and a linear transportation unit (an inclination angle of 30°) connecting the dispersing tank and a paper-making tank. A stirrer is attached to an opening at the top face of the dispersing tank. The chopped carbon fibers and the dispersion (a dispersing medium) can be charged from the opening. The paper-making tank is a tank including a mesh conveyor having a paper-making face with a width of 500 mm on its bottom, and a conveyor that can convey a carbon fiber substrate (a paper-making substrate) is connected to the mesh conveyor. Paper making was performed with a carbon fiber concentration in the dispersion of 0.05% by mass. The carbon fiber substrate after paper making was dried for 30 minutes in a drying oven at 200° C. The width of the obtained carbon fiber substrate is 500 mm, the length of the obtained carbon fiber substrate is 500 mm, and the weight per unit area was 100 g/m².

A sheet with a weight per unit area of 100 g/m² formed of 80% by weight of an unmodified polypropylene resin ("Prime Polypro" J105G manufactured by PRIME POLYMER Co, Ltd.) and 20% by weight of an acid-modified polypropylene resin ("ADMER" QB510 manufactured by Mitsui Chemicals, Inc.) as resins was prepared. The obtained carbon fiber substrate and resin sheet were laminated so as to form resin sheet/carbon fiber substrate/resin sheet to obtain a laminate. The obtained laminate was put between two metallic plates and was subjected to pressurization and heating together with the metallic plates with a surface pressure of 3 MPa by a pressing machine with a platen temperature of 230° C. Five minutes later, the pressurization by the pressing machine was stopped, and pressurization and cooling were performed with a surface pressure of 3 MPa by a pressing machine with a platen temperature of 100° C. Five minutes later, the pressurization by the pressing machine was stopped to obtain a first material listed in Table 1 as a structure precursor. The storage elastic modulus (G') of the structure precursor measured by the method of measurement was 1.5×10⁶ Pa.

[Second Material]

A resin sheet was obtained in a manner similar to the first material except that the weight per unit area of the resin was 135 g/m². Using the obtained carbon fiber substrate and resin sheet, lamination was performed so as to form resin sheet/carbon fiber substrate/resin sheet/carbon fiber substrate/resin sheet to obtain a laminate. A second material was obtained listed in Table 1 as a structure precursor in a manner similar to the first material except that the obtained laminate was used.

[Third Material]

Resin (b) was prepared using 40 parts by mass of "jER" (registered trademark) 1007 (manufactured by Mitsubishi Chemical Corporation), 20 parts by mass of "jER" (registered trademark) 630, and 40 parts by mass of "EPICLON" (registered trademark) 830 (manufactured by DIC Corporation) as resins, DICY 7 (manufactured by Mitsubishi Chemical Corporation) in an amount giving 0.9 equivalent of an active hydrogen group relative to an epoxy group of the entire epoxy resin component as a curing agent, and 2 parts by mass of DCMU 99 (manufactured by HODOGAYA CHEMICAL Co., Ltd.) as a curing accelerator. The prepared resin was applied to mold release paper using a reverse roll coater to prepare a film-shaped resin with a mass per unit area of 125 g/m$^2$. The obtained film-shaped resin and carbon fiber substrate were laminated so as to form resin film/carbon fiber substrate/resin film and were heated for 1.5 hours under pressurization with a surface pressure of 0.1 MPa by a pressing machine temperature-controlled to 70° C. to obtain a third material listed in Table 1 as a structure precursor. The degree of curing of the structure precursor measured by the method of measurement was 60%

[Fourth Material]

"TORAYCA" prepreg P3252S-12 manufactured by Toray Industries, Inc. was named fourth material (refer to Table 1).

[Fifth Material]

Using the chopped carbon fibers and the polypropylene resin used in the first material, the polypropylene resin was melted and kneaded with a biaxial extruder with a cylinder temperature set at 230° C.; the chopped carbon fibers were charged from a side feeder of the extruder, and the polypropylene resin was further kneaded. The kneaded resin was pulled out in a gut form, was cooled, and was then processed into pellets with a length of 6 mm to obtain a fifth material listed in Table 1 as a structure precursor.

First Example

First Example (A)

Figure 3:
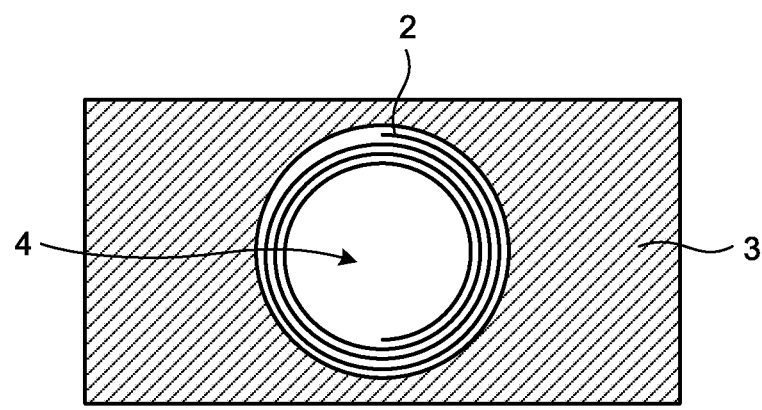
FIG. 3 is a schematic diagram for illustrating a method of manufacture of a first example.

A sheet having a certain size was cut out of the first material as a structure precursor. The cut-out structure precursor was made into a wound body to be arranged in the mold as illustrated in FIG. 3. In FIG. 3, the symbol 2 indicates the structure precursor, the symbol 3 indicates the mold, and the symbol 4 indicates the cavity. Table 2 lists the material and the filling rate of the structure precursor relative to the cavity of the mold in this process.

First Example (B)

The mold in which the structure precursor was arranged was put into a hot-air drier the atmospheric temperature of which was set at 230° C. to make the resin melt. Table 2 lists the molding time and the mold temperature in this process.

First Example (C)

After checking that the resin was in the melted state, the mold was taken out of the drier and was cooled. Table 2 lists the molding time and the mold temperature in this process.

First Example (D)

After checking that the resin solidified, a molded article was removed from the mold to obtain a first structure material.

Second Example

Second Example (A)

Figure 4:
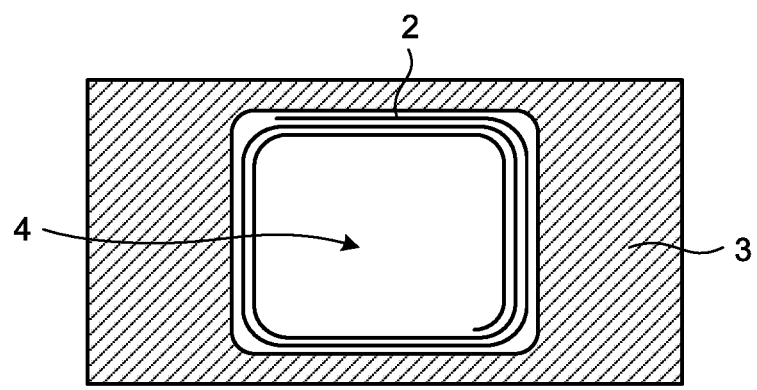
FIG. 4 is a schematic diagram for illustrating a method of manufacture of a second example (A).

As illustrated in FIG. 4, the shape of the cavity 4 of the mold 3 was made rectangular, and a structure precursor made into a wound body was arranged in this mold 3. Table 2 lists the material and the filling rate of the structure precursor relative to the cavity 4 of the mold 3 in this process.

Second Example (B) to Second Example (D)

A second structure material was obtained in a manner similar to the first example except that the molding temperature and time listed in Table 2 were employed.

Third Example

Third Example (A)

Figure 5:
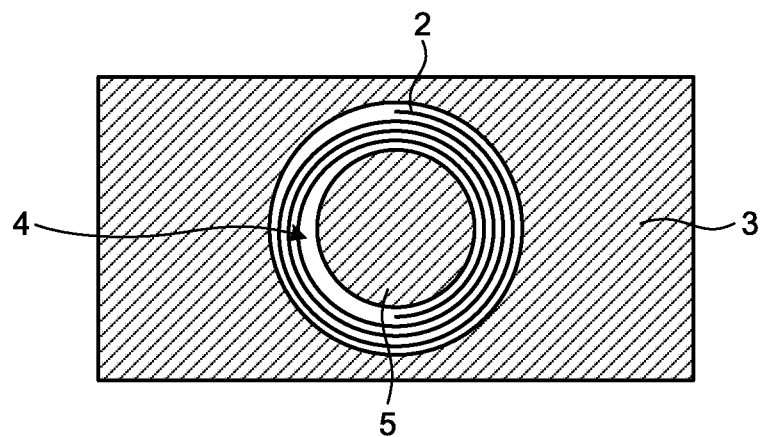
FIG. 5 is a schematic diagram for illustrating a method of manufacture of a third example (A).

A structure precursor was arranged in the mold in a manner similar to the first example, and a core material 5 was then arranged in a cavity 4 as illustrated in FIG. 5. Table 2 lists the material and the filling rate of the structure precursor relative to the cavity of the mold in this process.

Third Example (B) to Third Example (D)

A third structure material was obtained in a manner similar to the first example except that the molding temperature and time listed in Table 2 were employed.

Fourth Example

Fourth Example (A)

Figure 6:
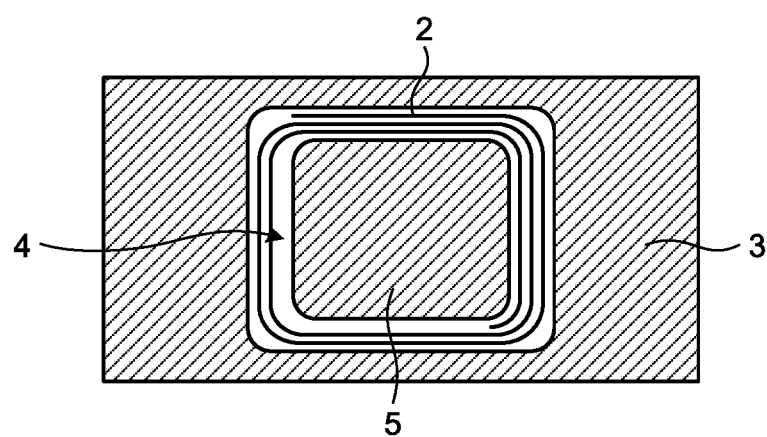
FIG. 6 is a schematic diagram for illustrating a method of manufacture of a fourth example (A).

A structure precursor was arranged in the mold in a manner similar to the second example, and the core material 5 was then arranged in the cavity 4 as illustrated in FIG. 6. Table 2 lists the material and the filling rate of the structure precursor relative to the cavity of the mold in this process.

Fourth Example (B) to Fourth Example (D)

A fourth structure material was obtained in a manner similar to the first example except that the molding temperature and time listed in Table 2 were employed.

Fifth Example

Fifth Example (A)

A structure precursor was arranged in the mold in a manner similar to the third example except that the structure precursor listed in Table 2 was used. Table 2 lists the material and the filling rate of the structure precursor relative to the cavity of the mold in this process.

Fifth Example (B) to Fifth Example (D)

A fifth structure material was obtained in a manner similar to the third example except that the molding temperature and time listed in Table 2 were employed.

Sixth Example

Sixth Example (A)

Figure 7:
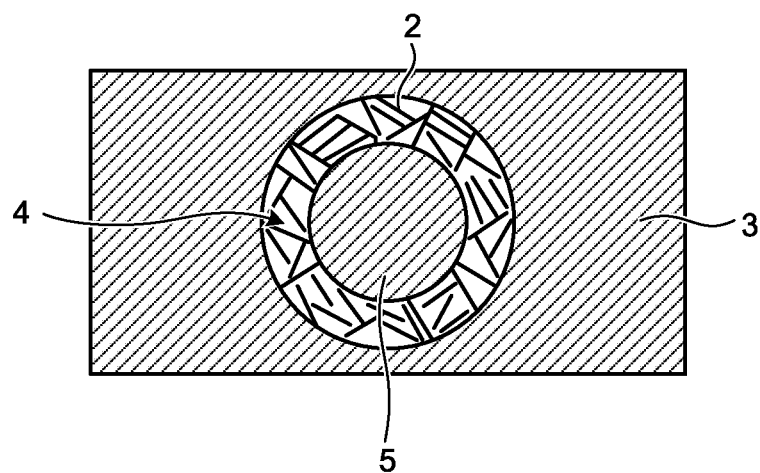
FIG. 7 is a schematic diagram for illustrating a method of manufacture of a sixth example (A).

From the first material, 60 rectangular structure precursors of 300 mm long and 10 mm wide were prepared. These rectangular structure precursors were arranged in the cavity 4 within the mold 3 as illustrated in FIG. 7. Table 2 lists the material and the filling rate of the structure precursor relative to the cavity of the mold in this process.

Sixth Example (B) to Sixth Example (D)

A sixth structure material was obtained in a manner similar to the third example except that the molding temperature and time listed in Table 2 were employed.

Seventh Example

Seventh Example (A)

Figure 8:
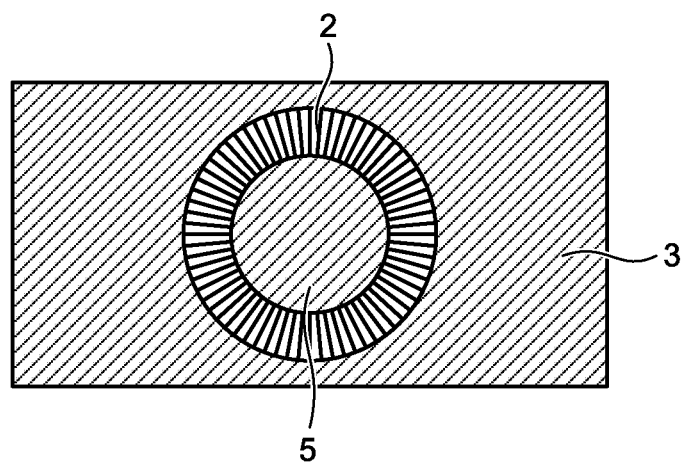
FIG. 8 is a schematic diagram for illustrating a method of manufacture of a seventh example (A).

Rectangular structure precursors were arranged in the mold in a manner similar to the sixth example except that a structure precursor 2 was arranged as illustrated in FIG. 8 and that 75 rectangular structure precursors of 10 mm wide were used. Table 3 lists the material and the filling rate of the structure precursor relative to the cavity of the mold in this process.

Seventh Example (B) to Seventh Example (D)

A seventh structure material was obtained in a manner similar to the third example except that the molding temperature and time listed in Table 3 were employed.

Eighth Example

Eighth Example (A)

From the second material, 100 rectangular structure precursors of 300 mm long and 3 mm wide were prepared. The rectangular structure precursors were arranged in the mold in a manner similar to the sixth example except that these rectangular structure precursors were used. Table 3 lists the material and the filling rate of the structure precursor relative to the cavity of the mold in this process.

Eighth Example (B) to Eighth Example (D)

An eighth structure material was obtained in a manner similar to the third example except that the molding temperature and time listed in Table 3 were employed.

Ninth Example

Ninth Example (A)

Figure 9:
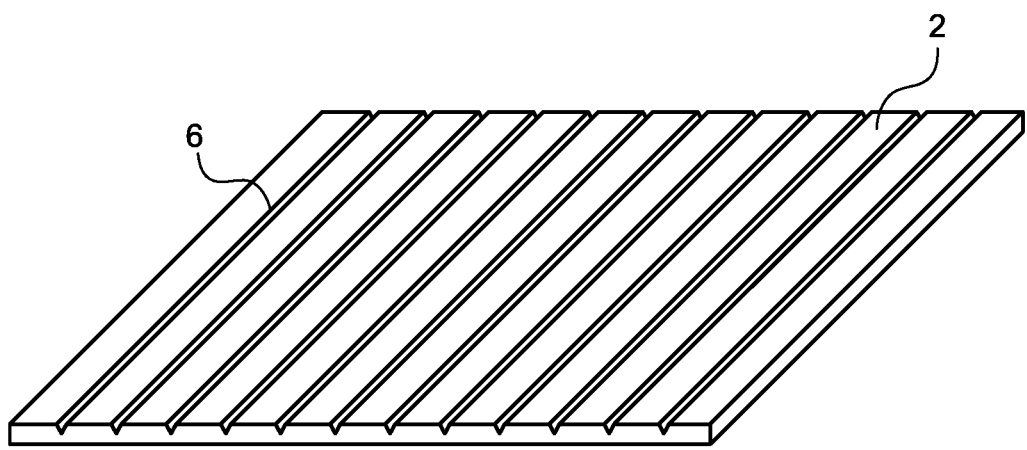
FIG. 9 is a schematic diagram for illustrating a method of manufacture of a ninth example (A).
Figure 9:
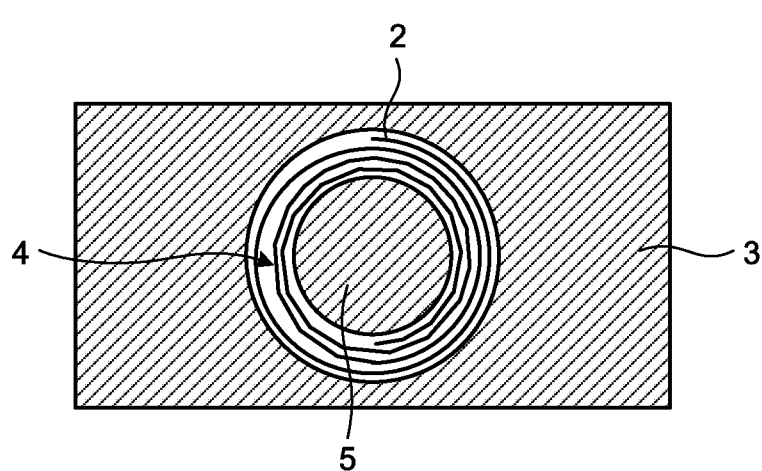

A structure precursor was arranged in the mold in a manner similar to the third example except that notches 6 at an interval of 10 mm starting at a position 100 mm apart from an end of the structure precursor 2 were formed as illustrated in FIG. 9(a). Table 3 lists the material and the filling rate of the structure precursor relative to the cavity of the mold in this process.

Ninth Example (B) to Ninth Example (D)

A ninth structure material was obtained in a manner similar to the third example except that the molding temperature and time listed in Table 3 were employed.

Tenth Example

Tenth Example (A)

A structure precursor was arranged in the mold in a manner similar to the third example except that the structure precursor and the mold listed in Table 3 were used. Table 3 lists the material and the filling rate of the structure precursor relative to the cavity of the mold in this process.

Tenth Example (B) to Tenth Example (D)

A tenth structure material was obtained in a manner similar to the third example except that the molding temperature and time listed in Table 3 were employed.

Eleventh Example

Eleventh Example (A)

A structure precursor was arranged in the mold in a manner similar to the third example except that the fifth material listed in Table 3 was used. Table 3 lists the material and the filling rate of the structure precursor relative to the cavity of the mold in this process.

Eleventh Example (B) to Eleventh Example (D)

An eleventh structure material was obtained in a manner similar to the third example except that the molding temperature and time listed in Table 3 were employed.

Twelfth Example

A structure precursor was arranged in the mold in a manner similar to the third example except that after the fourth material as a reinforcing layer was arranged in the mold, the structure precursor was arranged in the mold. Table 3 lists the material and the filling rate of the structure precursor relative to the cavity of the mold in this process.

First Comparative Example

A mold having the same shape as that of the first example and an injection molding machine were prepared. Injection molding was performed with a cylinder temperature set at 230° C. and a mold temperature set at 60° C. to obtain a fifty-first structure material using the fifth material. The clamping force of the mold in this process was 150 tons.

Second Comparative Example

A tubular film having elasticity was wound around a core material, and the third material was wound thereon to prepare a preform. A mouth on one end of the tubular film was tied not to leak air, the core material was then removed, a mouth on the other end was connected to a compressed air supply apparatus, and the preform was arranged in a mold. The mold was arranged in a pressing machine set so as to have a platen temperature of 150° C. and was pressurized so as to have a surface pressure of 1.0 MPa. Compressed air of 0.5 MPa was then supplied to fill the inside of the tubular film with the compressed air. Thirty minutes later, supply of the compressed air was stopped, and the mold was taken out of the pressing machine. A molded article was then taken out of the mold to obtain a fifty-second structure material.

Third Comparative Example

Figure 10:
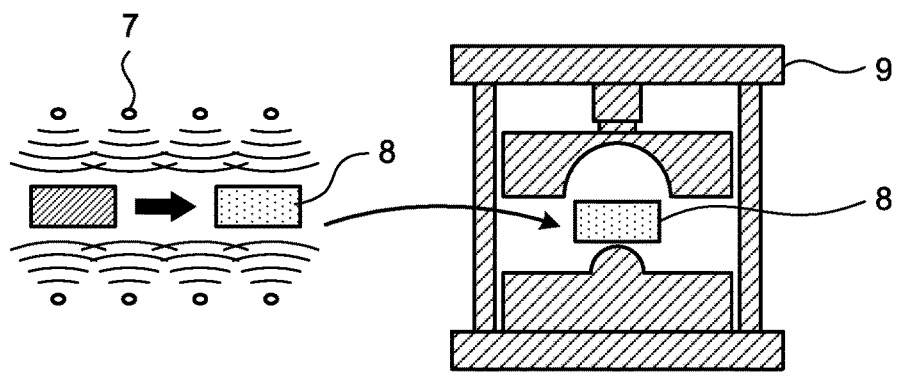
FIG. 10 is a schematic diagram for illustrating a method of manufacture of a third comparative example.
Figure 10:
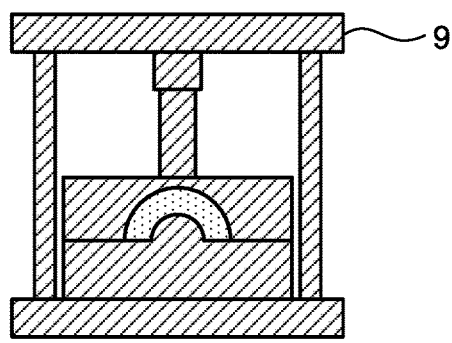
Figure 10:
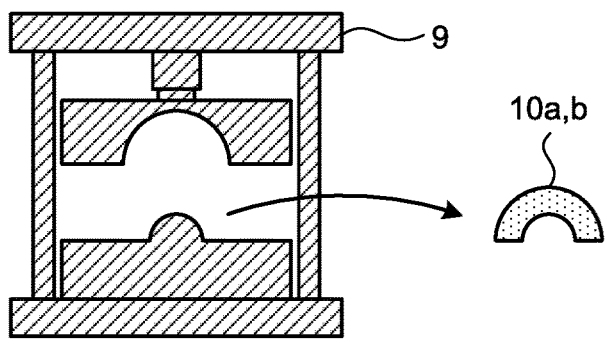
Figure 10:
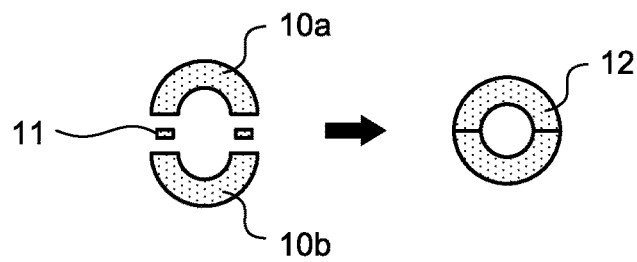

The first material (a structure precursor) (the symbol 8) with the resin made into a melted state by a heating apparatus 7 was arranged in a pressing machine 9 fixing a mold illustrated in FIG. 10(*a*) and was pressurized so as to have a surface pressure of 5.0 MPa as illustrated in FIG. 10(*b*). The mold surface temperature in this process was 100° C.; the pressurization was stopped 5 minutes later, and a molded article was removed to obtain a structure material 10*a* (refer to FIG. 10(*c*)). Similarly, a structure material 10*b* was also obtained. An adhesive 11 was applied to joint surfaces of the obtained structure material 10*a* and structure material 10*b*, which were laid on one another to obtain a cylindrical columnar structure material 12 (refer to FIG. 10(*d*)).

TABLE 1

| Material | | First Material | Second Material | Third Material | Fourth Material | Fifth Material |
|---|---|---|---|---|---|---|
| Reinforced fibers | | — | Carbon fiber | Carbon fiber | Carbon fiber | Carbon fiber | Carbon fiber |
| Resin | | — | Polypropylene | Polypropylene | Epoxy | Epoxy | Polypropylene |
| Structure precursor | | | | | | | |
| Thickness | mm | 0.28 | 0.56 | 0.26 | 0.13 | — |
| Vf | % | 20 | 20 | 20 | 58 | 20 |

TABLE 2

| | | First Example | Second Example | Third Example | Fourth Example | Fifth Example | Sixth Example |
|---|---|---|---|---|---|---|---|
| Structure precursor: | | | | | | | |
| Material | — | First Material | First Material | First Material | First Material | First Material | First Material |
| Length | mm | 300 | 300 | 300 | 300 | 300 | 300 |
| Width | mm | 850 | 1060 | 600 | 760 | 400 | 10 (60 pieces) |
| Thickness | mm | 0.28 | 0.28 | 0.28 | 0.28 | 0.28 | 0.28 |
| Shape | — | Wound | Wound | Wound | Wound | Wound | Rectangular |
| Volume | cm³ | 71 | 89 | 50 | 64 | 34 | 50 |
| Reinforcing layer: | | | | | | | |
| Material | — | — | — | — | — | — | — |
| Length | mm | — | — | — | — | — | — |
| Width | mm | — | — | — | — | — | — |
| Thickness | mm | — | — | — | — | — | — |
| Volume | cm³ | — | — | — | — | — | — |
| Mold: | | | | | | | |
| Outer layer | | | | | | | |
| Length | mm | 30 | 30 | 30 | 30 | 30 | 30 |
| Width | mm | 30 | 30 | 30 | 30 | 30 | 30 |
| Span | mm | 300 | 300 | 300 | 300 | 300 | 300 |
| Core material | | | | | | | |
| Length | mm | — | — | 16 | 16 | 16 | 16 |
| Width | mm | — | — | 16 | 16 | 16 | 16 |
| Span | mm | — | — | 300 | 300 | 300 | 300 |
| Sectional shape | — | Circular (solid) | Rectangular (solid) | Circular (hollow) | Rectangular (hollow) | Circular (hollow) | Circular (hollow) |
| Volume | cm³ | 212 | 270 | 152 | 193 | 152 | 152 |
| Molding condition: | | | | | | | |
| First process | | | | | | | |
| Temperature | ° C. | 23 | 23 | 23 | 23 | 23 | 23 |
| Filling rate | % | 33.7 | 33.0 | 33.2 | 33.0 | 22.1 | 33.0 |
| Second process | | | | | | | |
| Temperature | ° C. | 230 | 230 | 230 | 230 | 230 | 230 |
| Time | min | 30 | 30 | 30 | 30 | 30 | 30 |
| Molding pressure | MPa | 0.0 | 0.0 | 0.0 | 0.0 | 0.0 | 0.0 |
| Ultimate temperature | ° C. | 225 | 225 | 225 | 225 | 225 | 225 |
| Third process | | | | | | | |
| Temperature | ° C. | 23 | 23 | 23 | 23 | 23 | 23 |
| Time | min | 30 | 30 | 30 | 30 | 30 | 30 |
| Molding pressure | MPa | 0.0 | 0.0 | 0.0 | 0.0 | 0.0 | 0.0 |
| Ultimate temperature | ° C. | 80 | 80 | 60 | 60 | 60 | 60 |
| Structure material | | | | | | | |
| Specific gravity | g/cm³ | 0.36 | 0.36 | 0.36 | 0.36 | 0.24 | 0.36 |
| Specific bending modulus | — | 5.6 | 5.6 | 5.6 | 5.6 | 6.2 | 5.6 |

TABLE 3

|  |  | Seventh Example | Eighth Example | Ninth Example | Tenth Example | Eleventh Example | Twelfth Example |
|---|---|---|---|---|---|---|---|
| Structure precursor: |  |  |  |  |  |  |  |
| Material | — | First Material | Second Material | First Material | First Material | Fifth Material | First Material |
| Length | mm | 300 | 300 | 300 | 300 | 300 | 300 |
| Width | mm | 10 (75 pieces) | 3 (100 pieces) | 600 | 120 | 610 | 580 |
| Thickness | mm | 0.28 | 0.56 | 0.28 | 0.28 | 0.28 | 0.28 |
| Shape | — | Rectangular | Rectangular | Wound | Wound | Wound | Wound |
| Volume | cm$^3$ | 63 | 50 | 50 | 10 | 51 | 49 |
| Reinforcing layer: |  |  |  |  |  |  |  |
| Material | — | — | — | — | — | — | Fourth Material |
| Length | mm | — | — | — | — | — | 300 |
| Width | mm | — | — | — | — | — | 180 |
| Thickness | mm | — | — | — | — | — | 0.13 |
| Volume | cm$^3$ | — | — | — | — | — | 7 |
| Mold: Outer layer |  |  |  |  |  |  |  |
| Length | mm | 30 | 30 | 30 | 12 | 30 | 30 |
| Width | mm | 30 | 30 | 30 | 12 | 30 | 30 |
| Span | mm | 300 | 300 | 300 | 300 | 300 | 300 |
| Core material |  |  |  |  |  |  |  |
| Length | mm | 10 | 16 | 16 | 4 | 16 | 16 |
| Width | mm | 10 | 16 | 16 | 4 | 16 | 16 |
| Span | mm | 300 | 300 | 300 | 300 | 300 | 300 |
| Sectional shape | — | Circular (hollow) | Circular (hollow) | Circular (hollow) | Circular (hollow) | Circular (hollow) | Circular (hollow) |
| Volume | cm$^3$ | 188 | 152 | 152 | 30 | 152 | 152 |
| Molding condition: First process |  |  |  |  |  |  |  |
| Temperature | ° C. | 23 | 23 | 23 | 23 | 23 | 23 |
| Filling rate | % | 33.4 | 33.0 | 33.2 | 33.4 | 33.8 | 33.6 |
| Second process |  |  |  |  |  |  |  |
| Temperature | ° C. | 230 | 230 | 230 | 230 | 130 | 200 |
| Time | min | 30 | 30 | 30 | 15 | 60 | 30 |
| Molding pressure | MPa | 0.0 | 0.0 | 0.0 | 0.0 | 0.0 | 0.0 |
| Ultimate temperature | ° C. | 225 | 225 | 225 | 225 | 130 | 195 |
| Third process |  |  |  |  |  |  |  |
| Temperature | ° C. | 23 | 23 | 23 | 23 | 130 | 23 |
| Time | min | 30 | 30 | 30 | 30 | 60 | 30 |
| Molding pressure | MPa | 0.0 | 0.0 | 0.0 | 0.0 | 0.0 | 0.0 |
| Ultimate temperature | ° C. | 60 | 60 | 60 | 50 | 130 | 40 |
| Structure material |  |  |  |  |  |  |  |
| Specific gravity | g/cm$^3$ | 0.36 | 0.36 | 0.36 | 0.36 | 0.44 | 0.42 |
| Specific bending modulus | — | 5.6 | 5.6 | 5.6 | 5.6 | 4.8 | 5.0 |

TABLE 4

|  |  | First Comparative Example | Second Comparative Example | Third Comparative Example |
|---|---|---|---|---|
| Structure precursor: |  |  |  |  |
| Material | — | Fifth Material | Third Material | First Material |
| Length | mm | — | 300 | 300 |
| Width | mm | — | 600 | 300 |
| Thickness | mm | — | 0.28 | 0.28 |
| Shape | — | Pellet | Wound | Rectangular |
| Volume | cm$^3$ | — | 50 | 25 |
| Reinforcing layer: |  |  |  |  |
| Material | — | — | — | — |
| Length | mm | — | — | — |
| Width | mm | — | — | — |
| Thickness | mm | — | — | — |

TABLE 4-continued

|  |  | First Comparative Example | Second Comparative Example | Third Comparative Example |
|---|---|---|---|---|
| Volume | cm³ | — | — | — |
| Mold: Outer layer |  |  |  |  |
| Length | mm | 30 | 30 | 30 |
| Width | mm | 30 | 30 | 15 |
| Span | mm | 300 | 300 | 300 |
| Core material |  |  |  |  |
| Length | mm | 16 | — | 16 |
| Width | mm | 16 | — | 8 |
| Span | mm | 300 | — | 300 |
| Sectional shape | — | Circular (hollow) | Circular (hollow) | Semicircular |
| Volume | cm³ | 152 | 212 | 76 |
| Molding condition: First process |  |  |  |  |
| Temperature | ° C. | 60 | 23 | 100 |
| Filling rate | % | 100.0 | 23.8 | 100.0 |
| Second process |  |  |  |  |
| Temperature | ° C. | — | 130 | — |
| Time | min | — | 60 | — |
| Molding pressure | MPa | — | 0.5 | — |
| Ultimate temperature | ° C. | — | 130 | — |
| Third process |  |  |  |  |
| Temperature | ° C. | 60 | 130 | 100 |
| Time | min | 0.5 | 60 | 5 |
| Molding pressure | MPa | — | 0.5 | 5.0 |
| Ultimate temperature | ° C. | 65 | 130 | 110 |
| Structure material |  |  |  |  |
| Specific gravity | g/cm³ | 0.36 | 1.56 | 0.36 |
| Specific bending modulus | — | 1.8 | 2.3 | 5.6 |

In the first to the twelfth examples, structure materials that easily form complicated shapes and are excellent in lightness and mechanical characteristics were able to be obtained. No auxiliary materials and press molding machine were used, and the structure materials were able to be obtained without requiring high costs. In the third to the twelfth examples, tubular shapes were able to be obtained easily in a manner similar to a columnar body. In the fifth example, a structure material with improved lightness was able to be obtained. In the sixth to the eighth examples, rectangular structure precursors were used, whereby the time taken for preforming was able to be reduced. In the ninth example, notches were formed on the structure precursor, whereby deformation of the structure precursor was made further easier, and preforming was made easy. In the tenth example, a structure material with a small-diameter shape was able to be obtained. In the eleventh example, a structure material containing a thermosetting resin as the resin was able to be obtained. In the twelfth example, a structure material in which a reinforcing layer was formed on the surface layer of the structure material was able to be obtained, and a structure material more excellent in mechanical characteristics was able to be obtained.

In contrast, in the first comparative example, an injection molding machine was required, and a high clamping force was also required, whereby high costs were required, although a complicated shape was able to be formed. In the second comparative example, much time was required to be taken for preforming, giving poor productivity. In the third comparative example, a press molding machine was required, and a cylindrical tube was unable to be obtained in a piece of molding. Consequently, jointing with an adhesive is required, the adhesive increases weight, and the joint can be a weak part, thus giving no structure material excellent in mechanical characteristics.

INDUSTRIAL APPLICABILITY

The present invention is to provide a method for manufacturing a structure material that can easily form a complicated shape and can manufacture a structure material excellent in lightness and mechanical characteristics. Another object of the present invention is to enable a method for manufacturing a structure material that can manufacture a structure material without requiring high costs to be provided.

REFERENCE SIGNS LIST

1$a$ to 1$f$ Single filament
2 Structure precursor
3 Mold
4 Cavity
5 Core material
6 Notch
7 Heating apparatus
8 Structure precursor
9 Pressing machine
10$a$, 10$b$, 12 Structure material
11 Adhesive

The invention claimed is:
1. A method for manufacturing a structure material product that comprises a thermoplastic resin, reinforced fibers, and voids, the method comprising:

a first process step of arranging a structure precursor comprising the thermoplastic resin and the reinforced fibers in a mold with a surface temperature of 80° C. or less, the reinforced fibers inside the structure precursor being in a compressed state;

a second process step of raising the surface temperature of the mold up to a temperature at which a storage elastic modulus (G') of the structure precursor is less than $1.2 \times 10^8$ Pa so as to raise the reinforced fibers in the compressed state to form the voids;

a third process step of lowering the surface temperature of the mold down to a temperature at which the storage elastic modulus (G') of the structure precursor is $1.2 \times 10^8$ Pa or more so as to form the structure material product; and a fourth process step of removing the structure material product from the mold.

2. The method for manufacturing the structure material product according to claim 1, wherein a filling rate of the structure precursor in the mold is within a range of 10% or more and 80% or less of a cavity of the mold.

3. The method for manufacturing the structure material product according to claim 1, wherein a pressurizing force applied by the mold in the second process step and the third process step is within a range of 0 MPa or more and 5 MPa or less.

4. The method for manufacturing the structure material product according to claim 1, wherein a size of a cavity of the mold does not change before and after molding.

5. The method for manufacturing the structure material product according to claim 1, further comprising a process step of arranging at least one of a thermosetting resin composition containing a thermosetting resin and a thermoplastic resin composition containing a thermoplastic resin on a surface of the structure precursor or the structure material product.

6. The method for manufacturing the structure material product according to claim 1, wherein a weight of the mold is 30 kg or less.

7. The method for manufacturing the structure material product according to claim 1, wherein the structure precursor contains a foaming agent.

8. The method for manufacturing the structure material product according to claim 1, wherein the structure precursor comprises a mat comprising reinforced fibers and a matrix resin comprising a thermoplastic resin, and the mat comprising reinforced fibers is impregnated with a resin in advance.

9. The method for manufacturing the structure material product according to claim 1, wherein a mat comprising the reinforced fibers has a nonwoven fabric-like form manufactured by any of a wet paper making method, a dry paper making method, an air-laid method, and a weaving method.

10. The method for manufacturing the structure material product according to claim 1, wherein a matrix resin in the structure precursor is given in any form of film, particles, fibers, and liquid.

11. The method for manufacturing the structure material product according to claim 1, wherein the first process step includes a step of arranging the structure precursor made into a rectangular or wound body in the mold.

12. The method for manufacturing the structure material product according to claim 1, wherein a shape of the mold is cylindrical columnar, polygonal columnar, cylindrical tubular, or polygonal tubular.

13. The method for manufacturing the structure material product according to claim 1, wherein a pressurizing force applied by the mold in the second process step and the third process step is 0 MPa by using a mold having a cavity with a size that does not change before or after molding.

14. A method for manufacturing a structure material product that comprises a thermosetting resin, reinforced fibers, and voids, the method comprising:

a first process step of arranging a structure precursor comprising the thermosetting resin before setting and the reinforced fibers in a mold with a surface temperature of 80° C. or less, the reinforced fibers inside the structure precursor being in a compressed state;

a second process step of raising the surface temperature of the mold up to a temperature at which a degree of curing of the structure precursor is 10% or more and 90% or less so as to raise the reinforced fibers in the compressed state to form the voids;

a third process step of maintaining the structure precursor shape until the degree of curing of the structure precursor becomes higher than 90% so as to form the structure material product; and a fourth process step of removing the structure material product from the mold.

15. The method for manufacturing the structure material product according to claim 14, wherein the structure precursor comprises a mat comprising reinforced fibers and a matrix resin comprising a thermosetting resin, and the mat comprising reinforced fibers is impregnated with a resin in advance.

* * * * *